United States Patent
Droop et al.

(10) Patent No.: US 6,457,070 B1
(45) Date of Patent: Sep. 24, 2002

(54) APPARATUS AND METHOD FOR IDENTIFYING LOCATION OF A PERIPHERAL UNIT IN A COMPUTER SYSTEM

(75) Inventors: Jürgen Droop, Gütersloh; Reinhard Harasta, Paderborn, both of (DE)

(73) Assignee: Siemens Nixdorf Informationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/297,799

(22) PCT Filed: Sep. 23, 1997

(86) PCT No.: PCT/DE97/02155

§ 371 (c)(1),
(2), (4) Date: May 6, 1999

(87) PCT Pub. No.: WO98/21658

PCT Pub. Date: May 22, 1998

(30) Foreign Application Priority Data

Nov. 8, 1996 (DE) .......................................... 196 46 155

(51) Int. Cl.[7] .................................................. G06F 3/00
(52) U.S. Cl. .................. 710/15; 710/3; 710/8
(58) Field of Search .............................. 710/10, 3, 5, 8, 710/15; 702/108

(56) References Cited

U.S. PATENT DOCUMENTS

| 4,885,683 A | * 12/1989 | Coogan ...................... 364/200 |
| 5,051,895 A | *  9/1991 | Rogers ....................... 364/200 |
| 5,511,227 A |   4/1996  | Jones ............................ 710/9 |

FOREIGN PATENT DOCUMENTS

| EP | 0 209 923 | 1/1987 |
| EP | 0 308 043 | 3/1989 |
| GB | 2 202 062 A | 9/1988 |

OTHER PUBLICATIONS

Teodorescu, "Fehlertolerante Kommunikationssysteme", messen prüfen automatisieren, Jan./Feb. 1989.

* cited by examiner

*Primary Examiner*—Jeffrey Gaffin
*Assistant Examiner*—Harold Kim
(74) *Attorney, Agent, or Firm*—Schiff Hardin & Waite

(57) ABSTRACT

Disclosed are an arrangement and an operating method for determining the position of a peripheral system in a computer system, in which a predetermined operation of the peripheral system sets a marker in a diagnostic system which can be queried and the address of which enables the position to be determined.

8 Claims, 1 Drawing Sheet

APPARATUS AND METHOD FOR IDENTIFYING LOCATION OF A PERIPHERAL UNIT IN A COMPUTER SYSTEM

BACKGROUND OF THE INVENTION

1. Field of the Invention

The present arrangement and the method relate to the determination of the position of peripheral units in computer systems.

2. Description of the Related Art

In smaller computer systems, there are relatively few components of the same type, so that, in the event of problems with one of these components, the component in question can be readily located and, for example, replaced.

A large number of similar drives are often used for peripheral devices, in particular for magnetic disks, in high-performance systems; these drives are inexpensive and reliable due to the large numbers used in small and medium-sized systems. On high-performance systems the drives are often accommodated in separate housings, even being separated off by fire walls in some cases.

To achieve a high overall performance, a large number of separate control units are employed, to which the drives are connected, usually via a SCSI bus connection. If, for example, the addresses of the control units are dynamically allocated during system start-up, then if one disk drive fails it is not clear where this drive is located. Even if the addresses are manually allocated and written down by a technician during installation, it is still desirable to have a locating mechanism that can be verified by the computer.

SUMMARY OF THE INVENTION

An object of the invention, therefore, is to provide an arrangement and an operating method with which it is possible to determine the position of peripheral devices in a computer system.

The invention utilizes a second message system, that is present for diagnostic purposes, which has location-specific addressing. The message system monitors the peripheral devices for a specific operating state and stores its occurrence in a marker. Coupling the diagnostic system to the computer and its operating system enables the operating system software to bring about the specific operating state, query the markers, and establish the position of the peripheral device from the address of the marker.

The invention therefore relates to an arrangement and an operating method for determining the position of a peripheral system in a computer system, in which a predetermined operation of the peripheral system sets a marker in a diagnostic system which can be queried and the address of which enables the position to be determined.

DETAILED DESCRIPTION OF THE INVENTION

Figure 1:
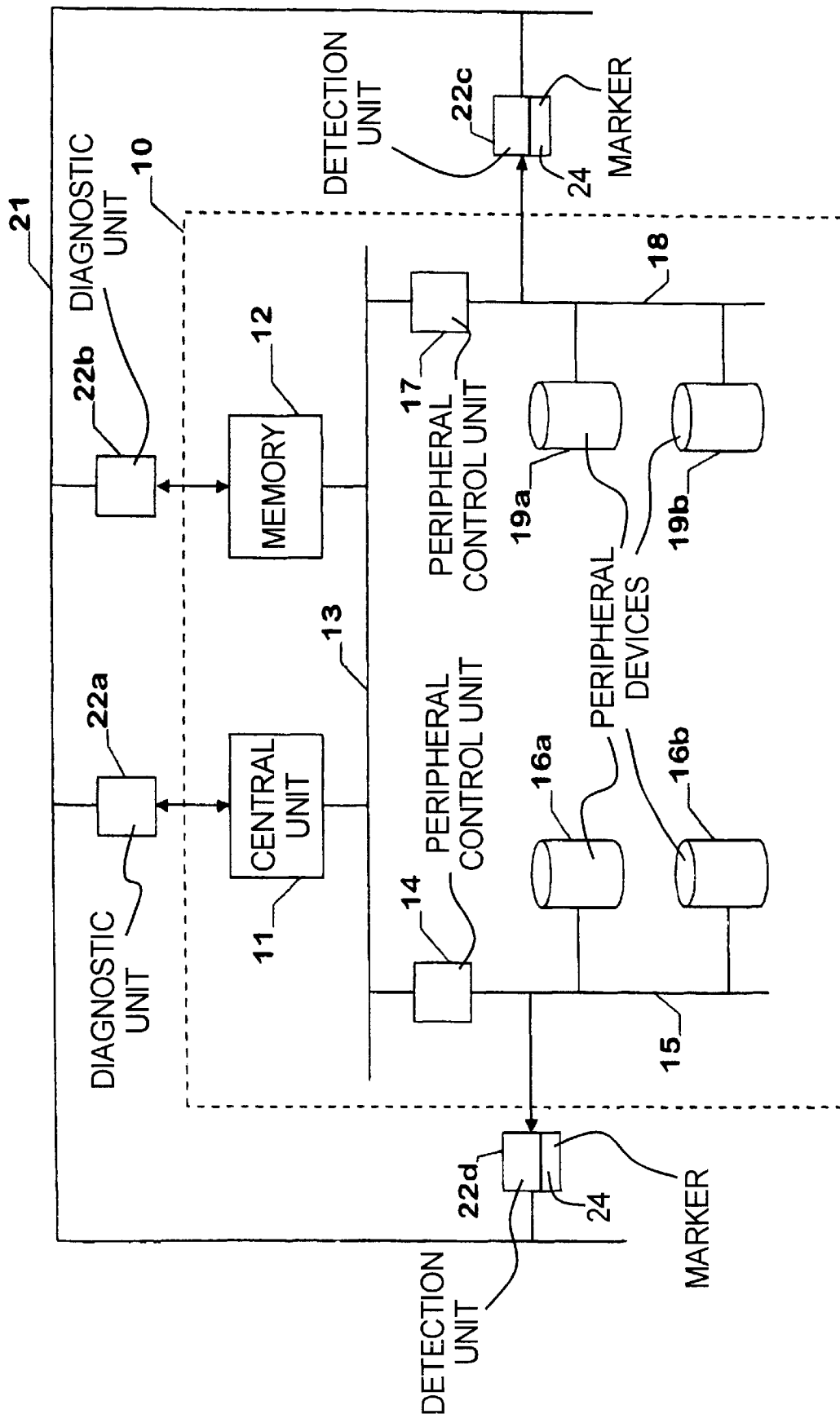
FIG. 1 shows a block circuit diagram of a computer system having a diagnostic system.

FIG. 1 shows a block circuit diagram of a computer system in which the invention may be used. The productive part of the computer system is indicated by a dashed outline 10. It includes, for example, a central unit 11, a memory 12, a central bus system 13, and peripheral control units 14 and 17, each of which respectively serves a peripheral bus 15 and 18 to which peripheral devices 16a, 16b, 19a and 19b connected. The bus system may be, for instance, a high-speed bus system, e.g. a PCI bus, a VME bus or another comparable bus system. The bus systems 15 and 18 for the peripheral devices are preferably designed as a SCSI bus.

Also present in addition to the equipment designated here as the productive part 10 is a test and diagnostic system comprising a number of units 22a ... d, which are preferably connected to each other via a bus system 21. While the central bus system and the peripheral bus systems are designed for maximum throughput, the bus system is designed for simple wiring, i.e. few conductor wires, and simple and reliable operation. Examples of such bus systems are the IIC bus and the CAN bus.

FIG. 1 shows four units 22a, 22b, 22c and 22d of the diagnostic system, of which one unit 22a is connected to the central unit 11 and another unit 22b is connected to the memory 12. The connections between the diagnostic units 22a and 22b and the control unit 11 and memory 21, respectively are indicated by two-headed arrows. These diagnostic units 22a and 22b perform test and coordination functions during the power-up phase of the system and can continue to be used during system operation, even if only to ensure an orderly shutdown. The two-headed arrows indicate that data exchange takes place in both directions. At least one of the units 22a and 22b also function as allocation units to identify locations from addresses.

Two further units 22c and 22d are connected, inter alia, to the peripheral bus system 15 and 18 in such a way that a predetermined state, preferably a state capable of context-free detection, of the peripheral bus system 15 and 18 that can be brought about by the central unit 11 can be detected and stored in a marker 24 in the unit 22c. This querying is represented in FIG. 1 by a simple arrow. The reset state is preferably used as the queried, because it can be detected simply and in a context-free manner, and because it must be initiated in any case during the power-up phase or in the event of problems with the peripheral devices.

The operating system in the central unit 11 therefore first sends a message to its assigned unit 22a, whereupon the unit 22a resets all markers in the units 22c and 22d and acknowledges completion of this operation. The operating system then performs a reset operation for the bus system 15 or 18 whose position is to be determined. Following this, a query is sent to the unit 22a to establish which marker is now set, which the unit 22a determines by interrogating all possible units 22c and 22d. If it is the unit 22c whose marker 24 is set, then it is the bus 18 on the right; if it sis the unit 22d whose marker 24 is set, then it is the bus 15 on the left.

Even if the central unit 11 has a position specification for the respective peripheral bus 15 or 18 in a table, the invention thus ensures that this specification can be verified.

Instead of querying the bus system 15 and 18, it is also possible for each device such as the peripheral devices 16a, 16b, 19a and 19b and peripheral control units 14 and 17 to be connected to the units of the peripheral devices and peripheral control units, for example, of the diagnostic system, with the mounting location determining the marker which is set. Of course, more units 22c and 22d would be provided, one for each peripheral unit and peripheral control unit. If the bus system 15 and 18 is additionally monitored for a reset, for example, then detection of the reset serves as a release signal. Subsequent addressing of a device 16a, 16b, 19a and 19b sets the marker assigned to the mounting location and thus enables a logical address to be assigned to the actual mounting location.

Although other modification and changes may be suggested by those skilled in the art, it is the intention of the inventors to embody within the patent warranted hereon all changes and modification as reasonably and properly come within the scope of their contribution to the art.

We claim:

1. An arrangement for determining a location of peripheral units in a computer system which includes an operating program running on a central unit forming an operating system, the peripheral units being connected to the central unit by data busses, comprising:

a data communication link which is separate from said data busses in said computer system;

a diagnostic system with addressable diagnostic units, said addressable diagnostic units being connected to each other and to the operating system via said data communication link, said addressable diagnostic units having unique addresses indicating position, said diagnostic system including an allocation unit which determines a position from an address, said addressable diagnostic units having markers, the peripheral units being connected to the diagnostic system so that said markers are uniquely assigned to each of the peripheral units, ones of said markers being queried and reset via said diagnostic system, said markers being set in an assigned one of said addressable diagnostic units by a predetermined state of the corresponding peripheral unit, the operating program generating the predetermined state of the peripheral unit by a predetermined operation and determines the assigned one of said addressable diagnostic units by the set marker, and hence determines a position of the peripheral unit.

2. An arrangement as claimed in claim 1, wherein the predetermined operation is a reset operation.

3. An arrangement as claimed in claim 1, wherein a plurality of peripheral units are subordinate to a further peripheral unit marker is assigned to the further peripheral unit which causes the markers for the plurality of peripheral units to be released.

4. An arrangement as claimed in claim 3, wherein the further peripheral unit is a peripheral bus.

5. An arrangement as claimed in claim 3, wherein the predetermined operation is a reset operation for the further peripheral unit and an addressing operation for the plurality of peripheral units.

6. An arrangement as claimed in claim 1, wherein the data communication link of the diagnostic units is a bus system.

7. An arrangement as claimed in claim 1. wherein the peripheral units are connected by a SCSI bus system and one state of said SCSI bus system sets the marker in the diagnostic unit.

8. An operating method for determining a position of peripheral units in a computer system which includes an operating program running on a central unit and a diagnostic system with addressable diagnostic units which are connected to each other and to the operating system via separate data communication means, comprising the steps of: connecting the peripheral units to the diagnostic system, uniquely assigning a marker in a diagnostic unit to each of the peripheral units, said marker being queried and reset via the diagnostic system, a predetermined state of a corresponding peripheral unit sets the assigned marker in the assigned diagnostic unit, removing all markers assigned to peripheral units, generating by a predetermined operation of the operating program the predetermined state of the peripheral unit whose position is to be determined, querying markers of the diagnostic system until a set marker is found, and determining a spatial position of the peripheral unit using an address of the marker by means of an allocation unit.

* * * * *

UNITED STATES PATENT AND TRADEMARK OFFICE
CERTIFICATE OF CORRECTION

PATENT NO.     : 6,457,070 B1
DATED          : September 24, 2002
INVENTOR(S)    : Jurgen Droop et al.

It is certified that error appears in the above-identified patent and that said Letters Patent is hereby corrected as shown below:

<u>Title page,</u>
Item [73], Assignee, please correct the Assignee from "Siemens Nixdorf Informationssysteme Aktiengesellschaft (DE)" to -- Fujitsu Siemens Computers GmbH (DE) --

Signed and Sealed this

Second Day of September, 2003

JAMES E. ROGAN
*Director of the United States Patent and Trademark Office*